United States Patent Office 3,849,419
Patented Nov. 19, 1974

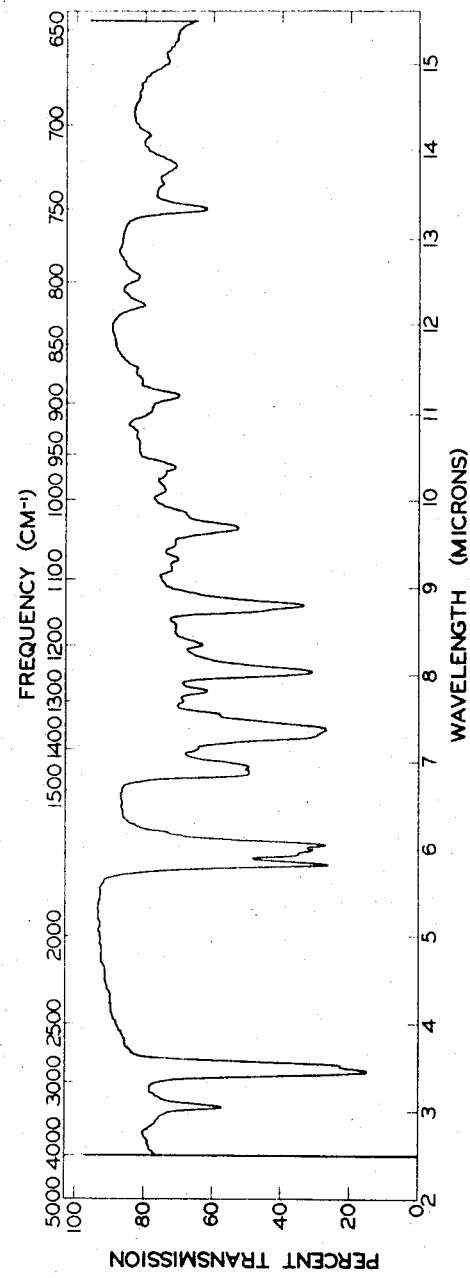

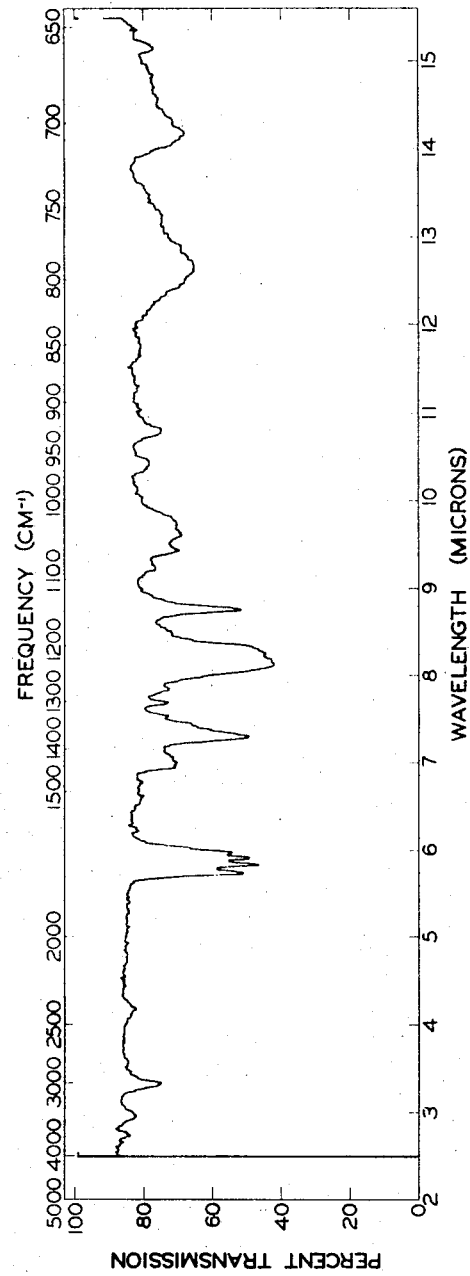

---

3,849,419
ANTIVIRAL ANTIBIOTIC
Donald C. Delong, David H. Lively, and Norbert Neuss, Indianapolis, Ind., assignors to Eli Lilly and Company, Indianapolis, Ind.
Original application Oct. 18, 1967, Ser. No. 676,310, now Patent No. 3,745,158, dated July 10, 1973. Divided and this application Dec. 26, 1972, Ser. No. 318,055
Int. Cl. C07d 95/00, 51/72
U.S. Cl. 260—268 PC                                    1 Claim

ABSTRACT OF THE DISCLOSURE

Antiviral antibiotic complex comprising at least four factors produced by the cultivation of *Arachniotus aureus*.

CROSS-REFERENCE

This application is a divisional application of co-pending patent application, Ser. No. 676,310, filed Oct. 18, 1967, now United States Pat. No. 3,745,158, July 10, 1973.

SUMMARY

This invention relates to a novel series of fermentation products and to their preparation. More particularly, this invention relates to a novel antiviral complex designated herein as A–21101 and to the individual components thereof.

The novel antiviral complex provided by the present invention comprises at least four individual factors which appear to be rather closely related structurally. The complex has the appearance of a slightly colored crystalline substance, insoluble in water and aliphatic hydrocarbons and soluble in most organic solvents including the alcohols, ethers, esters, chloroform, and the like. The complex is readily soluble in ethyl acetate. The antiviral complex of this invention is stable in solution over a pH range of at least pH 3 to pH 9 at ordinary temperatures. Electrometric titration of the complex fails to reveal any titratable groups.

As noted above, the antiviral complex of this invention comprises at least four distinct factors. In the nomenclature employed herein, the term "A–21101" will be used to designate the antiviral complex, while the various factors comprising the complex will be designated as factors I, II, III and IV. In the complex as commonly obtained, the predominating factors appear to be I and II.

The A–21101 complex, as well as factors II, III, and IV thereof, demonstrate antiviral activity and are therefore useful for preventing virus contamination of tissue cultures and for other uses wherein suppression of virus growth is desired. Thus, for example, the antibiotic is effective in controlling Coxsackie virus infections in mice when the antibiotic is administered intraperitoneally. Factor I can be converted by chemical means into Factor II and is therefore valuable as an intermediate for the preparation of the latter substance.

Factor I is a solid crystalline substance melting at about 213–217° C. In chloroform solution at a temperature of 26° C., the specific rotation of sodium D light by this factor is minus 315.1° when the concentration of the substance is 1% on a weight per volume basis. This factor has no intense absorption in the ultraviolet region, although a shoulder is seen consistently at 223 mμ.

A powder X-ray diffraction pattern of crystalline factor I using chromium radiation and a wave length of 2.28962 A. for calculating the interpyanar spacing gives values as follows:

| "d": | $I/I_1$ |
|---|---|
| 8.92 | .40 |
| 8.41 | .53 |
| 8.23 | .27 |
| 7.34 | .67 |
| 7.10 | .40 |
| 6.50 | 1.00 |
| 5.77 | .27 |
| 5.51 | .13 |
| 5.26 | .40 |
| 5.19 | .40 |
| 4.77 | .13 |
| 4.44 | .40 |
| 4.34 | .27 |
| 4.20 | .27 |
| 4.00 | .27 |
| 3.90 | .40 |
| 3.68 | .13 |
| 3.51 | .13 |
| 3.34 | .13 |
| 3.26 | .27 |
| 3.22 | .27 |
| 3.09 | .13 |
| 3.04 | .13 |

Figure 1:
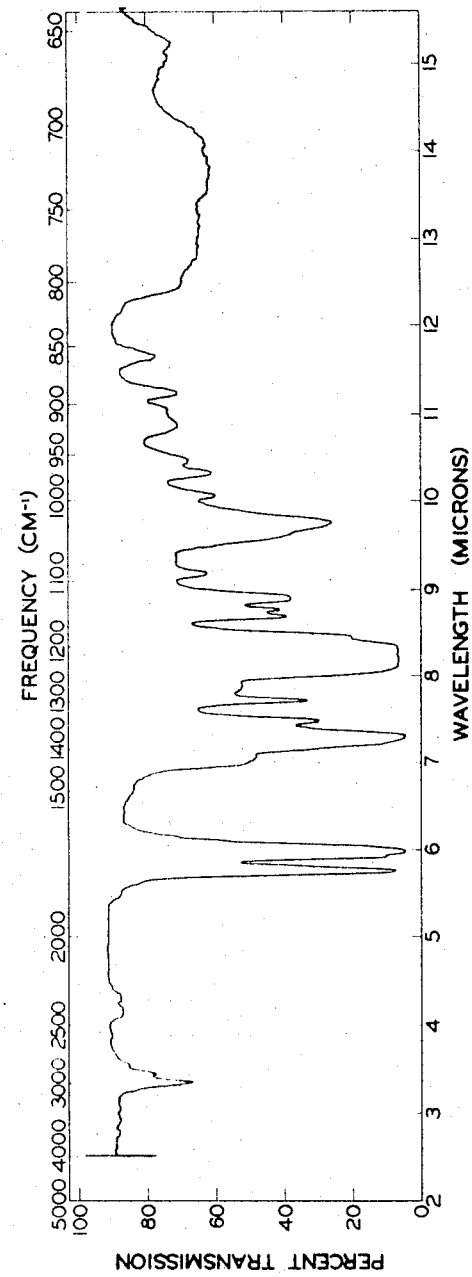

The infrared absorption spectrum of crystalline factor I in chloroform solution is shown in FIG. 1 of the accompanying drawings. The following distinguishable absorption maxima are observed in the region between 2 and 15 microns: 3.34, 3.44, 3.53, 5.75, 5.91, 5.97, 7.05 (shoulder), 7.28, 7.46, 7.70, 8.02, 8.45, 8.68, 8.76, 8.89, 9.17, 9.74, 10.04, 10.31, 10.45, 10.86, 11.02, and 11.65 microns.

Mass spectral data indicate that the molecular ion for factor I is 534. The empirical formula in best agreement with all of the foregoing data is $C_{24}H_{26}O_8N_2S_2$. The probable structure of this factor is as follows:

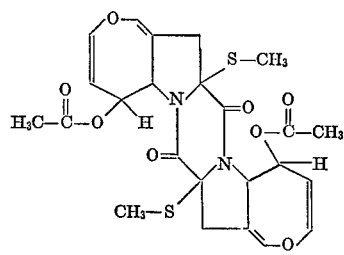

Factor I is convertible by chemical methods into factor II which demonstrates a high degree of activity against Coxsackie virus in mice. Such chemical transformation can be accomplished by methods well known in the art, as for example by treatment of the S-methyl compound with methyl iodide to produce the sulfonium salt followed by treatment of the salt with sodium sulfide in alcohol to induce elimination of the S-methyl groups with simultaneous formation of the disulfide linkage.

Factor II is a solid crystalline material melting with decomposition at about 210–215° C. In chloroform solution at a temperature of about 26° C., the specific rotation of sodium D light by this factor is minus 549.7° when the concentration of the substance is 0.5% on a weight per volume basis.

A powder X-ray diffraction pattern of crystalline factor II using chromium radiation and a wave length of 2.28962 A. for calculating the interplanar spacing gives values as follows:

| "d": | $I/I_1$ |
|---|---|
| 9.52 | 1.00 |
| 6.39 | .50 |
| 5.74 | .08 |
| 5.33 | .20 |
| 4.80 | .20 |
| 4.52 | .60 |
| 3.85 | .80 |
| 3.69 | .10 |
| 3.46 | .10 |
| 3.32 | .20 |
| 3.23 | .10 |
| 3.09 | .06 |
| 2.82 | .10 |
| 2.26 | .04 |

Figure 2:
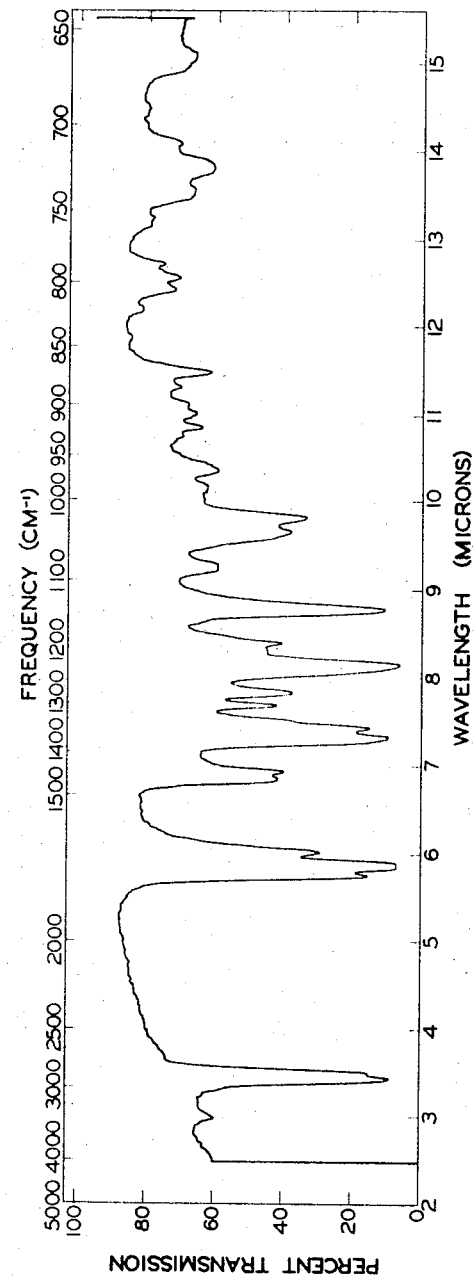

The infrared absorption curve of the crystalline factor as a mineral oil mull is shown in FIG. 2 of the accompanying drawings. The following distinguishable absorption maxima are observed in the region from 2 to 15 microns: 2.98, 5.76, 5.88, 6.02, 6.85, 6.93, 7.32, 7.43, 7.68, 7.82, 8.14, 8.39, 8.78, 9.25, 9.64, 9.80, 10.15, 10.35, 10.75, 10.86, 11.02, 11.13, 11.31, 11.49, 11.87, 12.19, 12.42, 12.55, 12.72, 13.17, 13.25, 13.55, 13.82, 14.08, 14.05 and 15.01 microns.

Mass spectral data for factor II indicate the molecular ion, less the two sulfur atoms, to be 440, thus indicating the molecular weight to be 504. The empirical formula in best agreement with all of the foregoing data is $$C_{22}H_{20}O_8N_2S_2.$$

The structural formula which best fits all of the foregoing data is as follows:

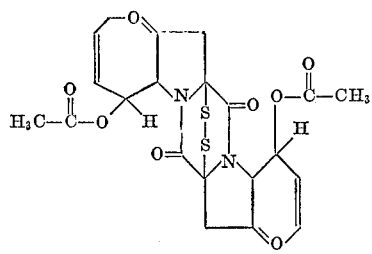

Factor II is effective against Coxsackie virus infections in mice when administered intraperitoneally, the $ED_{50}$ being 8 mg./kg. The acute toxicity of the substance in mice by IP injection, expressed as $LD_{50}$, is about 40 mg./kg. Acid hydrolysis converts factor II into factor III. The substance is therefore also a valuable intermediate for the preparation of the latter substance.

Factor III is a solid substance melting at about 198–200° C. This factor exhibits adsorption in the ultraviolet region with a maximum at 295 mμ with an $a_M$ value of 2,380 and a shoulder at 224 mμ with an $a_M$ value of 7,900.

A powder X-ray diffraction pattern of the factor using chromium radiation at a wavelength of 2.28962 A. for calculating the interplanar spacing gives values as follows:

| "d": | $I/I_1$ |
|---|---|
| 8.71 | 1.00 |
| 7.88 | .70 |
| 7.40 | .10 |
| 6.69 | .70 |
| 6.46 | .50 |
| 6.25 | .50 |
| 5.67 | .20 |
| 5.20 | .30 |
| 5.07 | .10 |
| 4.77 | .40 |
| 4.46 | .20 |
| 4.31 | .30 |
| 4.23 | .30 |
| 3.94 | .30 |
| 3.86 | .90 |
| 3.59 | .20 |
| 3.49 | .20 |
| 3.40 | .30 |
| 3.20 | .40 |
| 3.03 | .20 |
| 2.96 | .10 |
| 2.86 | .30 |
| 2.60 | .10 |
| 2.50 | .04 |
| 2.24 | .04 |

The infrared absorption spectrum of factor III as a mineral oil mull is shown in FIG. 3 of the accompanying drawings. The following distinguishable absorption maxima are observed in the region between 2 and 15 microns: 3.05, 5.81, 5.94 (shoulder) 5.98 (shoulder), 6.04, 6.88, 6.93, 7.30 (shoulder) 7.38, 7.53 (shoulder), 7.69, 7.81, 8.03, 8.34, 8.79, 9.20, 9.32, 9.48, 9.67, 9.85, (shoulder), 10.10, 10.38, 11.05, 11.20, 11.35, 11.48, 12.22, 12.55, 13.34, 13.62, 13.83, 14.18, and 15.04 microns.

Mass spectral data indicate that the molecular ion for factor III (less the two sulfur atoms) is 398. The empirical formula in best agreement with all the foregoing data is $C_{20}H_{18}O_7N_2S_2$, indicating the molecular weight of the factor to be 462.

The best evidence indicates the structure of the factor to be:

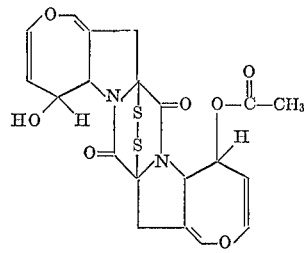

Factor III is active against measles virus and against polio viruses, types I, II, and III, and is therefore valuable in preventing contamination of tissue cultures by any of these viruses. The factor is also effective by intraperitoneal administration against Coxsackie virus infections in mice, the $ED_{50}$ being 6 mg./kg. The acute toxicity in mice by IP injection, expressed as $LD_{50}$, is about 35 mg./kg.

Factor IV is a solid crystalline substance melting at about 200–205° C. In chloroform solution the specific rotation of sodium D light by Factor IV is minus 491.8° at a temperature of 26° C. when the concentration of the substance is 0.5% on a weight per volume basis.

A powder X-ray diffraction pattern of crystalline factor IV using chromium radiation and a wave length of 2.28962 A. for calculating the interplanar spacing gives values as follows:

| "d" | $I/I_1$ |
|---|---|
| 8.71 | 1.00 |
| 7.93 | .60 |
| 7.32 | .20 |
| 6.69 | .60 |
| 6.325 | .60 |
| 5.69 | .20 |
| 5.20 | .30 |
| 5.10 | .30 |
| 4.78 | .50 |
| 4.45 | .40 |
| 4.29 | .30 |
| 4.19 | .50 |
| 3.95 | .40 |
| 3.81 | .70 |
| 3.61 | .10 |
| 3.49 | .20 |
| 3.37 | .20 |
| 3.16 | .30 |
| 3.06 | .05 |
| 2.91 | .08 |
| 2.84 | .10 |
| 2.70 | .08 |
| 2.58 | .08 |
| 2.21 | .20 |
| 2.12 | .08 |
| 2.09 | .05 |
| 1.99 | .10 |

The infrared absorption spectrum of factor IV in chloroform solution is shown in FIG. 4 of the accompanying drawings. The following distinguishable absorption maxima are observed in the region between 2 and 15 microns: 2.95, 3.32, 5.73, 5.82, 5.90, 5.97, 7.0, 7.28, 7.52, 7.67, 7.82, 8.1, 8.75, 9.22, 9.41, 9.58, 9.7, 10.4, and 10.78 microns.

The ultraviolet absorption spectrum of factor IV shows a maximum at 265 m$\mu$ with an $a_M$ value of 3,880 and a shoulder at 226 m$\mu$ with an $a_M$ value of 9,040.

The molecular ion for factor IV (less the two sulfur atoms) as determined from mass spectral data is 832, suggesting a molecular weight for the factor of 446. The empirical formula for factor IV, which is in best agreement with all the foregoing data, is $C_{20}H_{18}O_6N_2S_2$. The probable structure is as follows:

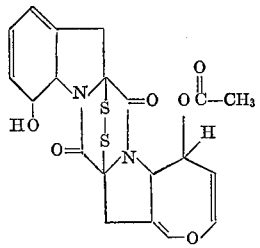

Factor IV is active by intraperitoneal injection at a level of 5 mg./kg. (Ed$_{50}$) against Coxsackie virus infections in mice and is active against polio virus type III in tissue culture. The acute toxicity of the compound in mice by IP injection, expressed as LD$_{50}$, is about 50 mg./kg.

The novel antiviral antibiotic of this invention is produced by culturing an A–21101 producing strain of an organism grown under aerobic conditions in a suitable culture medium until the said medium contains substantial antiviral activity. The antiviral agent can be recovered by employing various isolation and purification procedures known in the art.

The organism which produces A–21101 was obtained from the Central Bureau voor Schimmelcultures, Baarn, Netherlands, under the designation *Arachniotus aureus* (Eidam) Schroeter and has been placed on permanent deposit with the culture collection of the Northern Regional Research Laboratories at Peoria, Ill., where it has been assigned culture number NRRL 3205. The genus *Arachniotus* is placed in the family *Gymnoascaceae*, order *Aspergillales* and class *Ascomycete*. An essential feature in characterizing a culture in the family *Gymnoascaceae* is the demonstration of sexual spores, or asci. However, with this culture of *Arachniotus aureus* the demonstration of such ascospores has not been possible. The failure to observe ascospores is probably due to the fact that the presently employed organism develops only the imperfect form in culture. This possibility is recognized in the catalogue of the above-named bureau, wherein it is pointed out that many of the cultures listed therein under the name of the perfect stage develop only the imperfect form in culture. Nevertheless, it must be acknowledged that complete confirmation of the taxonomy of the organism cannot be considered to be established without the demonstration of the presence of ascospores.

The failure of the organism to produce ascospores creates an additional problem in that additional steps must be taken to obtain growth in large scale equipment. In most of the commonly employed vegetative media the growth of the organism takes the form of mycelial pellets. In order to obtain a uniform inoculum with sufficient growth centers to permit uniform growth throughout the production medium, it is generally necessary to disrupt the pellets, as for example, by subjecting the vegetative culture to a mechanical blending operation. Such a blending step increases the possibility of contamination of the medium by air-borne organisms. Since antibiotic A–21101 is essentially devoid of antibacterial or antifungal activity against the commonly encountered organisms, it is highly desirable to include low levels of another antibiotic in the fermentation medium. One such antibiotic suitable for suppressing contamination by bacterial and fungal organisms is erythromycin. Generally, levels of about 25 mcg. to about 200 mcg. of erythromycin per milliliter of fermentation medium are sufficient to maintain the fermentation medium free of contaminating organisms without interfering with the production of the antiviral antibiotic.

The culture medium employed in producing A–21101 can be any one of a variety of media since the organism which produces the antibiotic is capable of utilizing energy from a variety of sources. In general, it can be said that the medium should include sources of assimilable carbon and nitrogen together with the mineral salts commonly recognized as necessary or desirable for the growth of microorganisms. A source of growth factors, such as yeast or yeast extract, can be employed in the media with beneficial results. For economy of production, maximum yield of the antibiotic and ease of isolation, certain culture media containing relatively simple nutrient sources are preferred.

Satisfactory sources of carbon include glucose, fructose, maltose, sucrose, soluble starch, molasses, cornsteep solids, and the like, glucose or molasses being preferred.

Suitable sources of nitrogen include beef extract, peptones (meat or soy), hydrolyzed casein, yeast, amino acid mixtures, and the like. Currently preferred sources of nitrogen are yeast extract and peptones.

Among the minerals which may be included in the media are those providing calcium, magnesium, sodium, potassium, iron, chloride, sulfate, and carbonate ions.

As with other microorganisms, it will be understood that essential trace elements of various kinds should be included in the culture medium for growing the organism employed in this invention. Such trace elements are commonly supplied as impurities incidental to the addition of the other constituents of the medium.

The initial pH of the culture medium can be varied widely. However, it has been found desirable to initiate the fermentation in a medium at a pH between about 6 and about 8 and preferably between about 6 and 7.

During the growth of the organism in the production medium, the pH of the medium will increase gradually from the initial levels to a pH of about 8, the final pH being dependent at least in part on such factors as the initial pH of the medium, the buffers present therein, and the length of time the organism is permitted to grow.

Submerged aerobic culture conditions are the conditions of choice for the production of the antibiotic. For the preparation of relatively small quantities, shake flasks and surface culture in bottles can be employed. However, for the preparation of larger quantities of the antibiotic, submerged aerobic culture in sterile tanks is preferred. Inasmuch as a growth lag is usually experienced when the fermentation medium is inoculated directly with the organism, it is desirable to prepare an intermediate vegetative culture and to inoculate the fermentation medium therewith. Since the growth of the organisms in the commonly employed vegetative media usually takes the form of mycelial pellets, it is preferred to disrupt the pellets, as for example by subjecting the vegetative culture to a mechanical blending operation, prior to the inoculation of the fermentation medium. The mechanical blending operation provides a uniform inoculum with sufficient growth centers to permit uniform growth throughout the production medium. The medium in which the vegetative inoculum is produced can be either the same as or different from the medium used for the large scale production of the antibiotic. As previously noted, the lack of antibacterial or antifungal activity of A-21101 makes it highly desirable to include low levels of another antibiotic in the fermentation medium in order to reduce contamination by air-borne organisms. An especially suitable antibiotic for such purpose is erythromycin, commonly employed at levels of about 25 mcg. to about 200 mcg. of erythromycin per ml. of fermentation medium.

The organism which produces A-21101 grows best at temperatures in a range of about 25 to about 35° C. Optimal production of the antibiotic appears to occur at temperatures between about 25 and about 28° C.

As is customary in aerobic submerged culture processes, sterile air is blown through the culture medium during the fermentation. For efficient growth of the organism and consequent efficient production of the antibiotic, the volume of air employed in tank production is preferably in excess of about one-tenth volume of air per minute per volume of culture medium. Most efficient growth and optimal yields of A-21101 are obtained when the volume of air used is at least 0.3 volumes of air per minute per volume of culture medium.

In general, maximum production of the antibiotic occurs within about 2 to 5 days after inoculation of the culture medium when submerged aerobic culture or shake flask culture is employed, and within about 5 to 10 days when surface culture is employed.

The antibiotic is recovered from the fermentation medium by standard procedures. Generally speaking, the production medium is filtered from the mycelial growth and the resulting broth is extracted with ethyl acetate. The ethyl acetate extract is taken to dryness in vacuo and the residue is dissolved in a suitable solvent mixture such as, for example, a three-to-one mixture of toluene and ethyl acetate. The solution is then passed through a column packed with a suitable adsorbent and fractions containing the antibiotic are collected. One of the preferred adsorbents for the fractionation is silica gel. The progress of the fractionation can be monitored by thin layer chromatography of samples of the various fractions. On silica plates using a solvent system comprising two parts toluene to one part ethyl acetate, the following $R_f$ values for the individual factors are observed: Factor I, 0.24; Factor II, 0.31; Factor III, 0.36; Factor IV, 0.31. In order to make the spots visible on the chromatogram, the plate is usually sprayed with phosphomolybdic acid and heated for about 5 minutes in an oven at about 100° C. Those fractions containing the same factor are pooled and evaporated to dryness, and the residue is dissolved in a suitable solvent, such as for example, methanol and crystallized. Those fractions still containing mixtures of two factors can be made to yield the individual factors by subjecting the residues to fractional crystallization or further chromatography using a different adsorbent, as for example, alumina.

The practice of the invention is further illustrated in the following non-limiting examples.

EXAMPLE 1

Agar slants are inoculated with the organism *Arachniotus aureus* and are incubated at about 25° C. for 7 to 10 days. The composition of the slant medium is as follows:

|  | G. |
|---|---|
| Dextrose | 5 |
| Yeast extract | 2 |
| Calcium carbonate | 3 |
| Agar | 20 |

Deionized water: 800 ml.
V-8 juice*: 200 ml.

*A commercial blend of vegetable juices.

The foregoing medium is sterilized by heating in an autoclave at 121° C. for 25 minutes prior to inoculation with the organism. The pH of the medium after sterilization is in the range of pH 7.0 to pH 7.2. A portion of the growth from the agar slants is transferred into 250 ml. Erlenmeyer flasks containing 60 ml. per flask of a vegetative medium having the following composition:

|  | G. |
|---|---|
| Glucose | 30 |
| Sodium nitrate | 3.7 |
| Potassium hydrogen phosphate | 1 |
| Potassium chloride | 0.5 |
| Magnesium sulfate heptahydrate | 0.5 |
| Yeast extract | 3 |

Ferrous sulfate heptahydrate: 10 mg.
Deionized water to 1000 ml.

The foregoing medium is prepared by combining two separately prepared solutions, one containing 30 g. of glucose in 200 ml. of water, the other containing the remaining constituents of the medium. The solutions are separately sterilized by heating in an autoclave at 121° C. for 20 minutes prior to being combined. The flasks containing the inoculated vegetative medium are incubated at about 25° C. for about 96 hours on a rotary shaker operating at 250 r.p.m. and having a 2-inch throw. Upon completion of the incubation period the growth consists of mycelial pellets. The pellets are disrupted during a 15-second blending step using a mechanical blender of the Waring type. The suspension so obtained is employed to inoculate a production medium having the following composition:

|  | G. |
|---|---|
| Sucrose | 25 |
| Malt extract | 10 |
| NZ case peptone | 10 |
| Potassium hydrogen phosphate | 2 |

Brer Rabbits molasses: 25 ml.
Cornsteep (50% solids): 5 ml.
Deionized water: 1000 ml.

The pH of the production medium after sterilization at about 121° C. for 20 minutes is about pH 6.2. The sterilized production medium is inoculated with about 5 percent (volume/volume) of the suspension obtained by blending the vegetative culture. The inoculated production medium is incubated under the conditions described for incubation of the vegetative medium for about 120 hours. During the fermentation the pH of the medium increases from an initial level of about pH 6.2 to a final pH which may be as high as pH 7.8. The antiviral antibiotic A-21101 is found in the fermentation broth. The fermentation mixture is filtered and the filtrate is extracted with ethyl acetate. Evaporation of the combined ethyl acetate extracts in vacuo affords the crude antibiotic complex.

EXAMPLE 2

The production of antiviral agent A–21101 in stirred equipment is illustrated in the following procedure:

A growing vegetative culture is prepared according to the procedure described in Example 1. The culture so obtained is blended with a high speed mechanical blender of the Waring type in order to obtain a uniform suspension of the organism in the medium. Ten-milliliter portions of the suspension so obtained are employed to inoculate a series of 1000-ml. Erlenmeyer flasks containing 200 ml. of a medium having the following composition:

| | G. |
|---|---|
| Sucrose, technical grade | 25 |
| Malt extract | 10 |
| Hydrolyzed casein (N–Z Case) | 10 |
| Potassium hydrogen phosphate | 2 |

Molasses, edible grade: 25 ml.
Cornsteep liquor: 5 ml.
Deionized water: 1000 ml.

The flasks containing the medium are sterilized by heating for 45 minutes at 120° C. prior to inoculation. The inoculated medium is incubated at 25–26° C. for 48 hours on a rotary shaker having the specifications listed in Example 1. The contents of seven flasks after incubation are combined in a 4-liter flask fitted with a side arm and hose and are employed to inoculate 28 liters of the above medium in a stirred fermentation tank. The fermentor containing the medium is sterilized for 40 minutes at 120–125° C. under a pressure of 17–20 p.s.i. with the agitator running at 350 r.p.m. The fermentor is a fully baffled tank having two 5-inch 6-bladed, turbine type impellers and is provided with means for aeration. To suppress contamination, 25 mcg. of erythromycin are added per milliliter of medium. The inoculated production medium is incubated at 25° C. for about 90 hours with an aeration rate of about 0.3 volume of air per volume of broth per minute. The impellers are operated at 420 r.p.m. throughout the fermentation period. Approximately 0.2 g./l. of a commercial antifoam agent are added to the medium in order to minimize foaming. The pH of the medium varies from an initial pH of about pH 6.0 to a pH of about pH 7.0 at the compeltion of the fermentation. Significant growth is apparent after about 40 hours of incubation and antiviral activity is readily detectable by about 72 hours post-inculation.

EXAMPLE 3

The individual factors comprising the A–21101 complex are obtained as follows:

A 15 g. sample of dried broth extract prepared as in Example 1 is dissolved in 200 ml. of a solvent mixture comprising 3 parts of toluene to 1 part of ethyl acetate. The solution is passed over a chromatographic column having a 3.5 inch inside diameter packed to a depth of about 48 inches with 1500 g. of silica gel in which the particle size is smaller than 0.08 mm. The column is eluted with approximately 7 liters of the foregoing solvent mixture and fractions, each containing about 75 ml. of solvent, are collected. The first 12 fractions are pooled and evaporated to dryness to yield about 45 mg. of crude factor III. The fraction size is then increased to 100 ml. per fraction, and the following 12 fractions are pooled and evaporated to dryness to provide a mixture comprising factor II and factor IV. The individual factors are separated by fractional crystallization of the mixture from methanol. The final fractions when evaporated to dryness yield factor I. The progess of the chromatographic fractionation is monitored by subjecting samples of each fraction to thin layer chromatography on silica gel plates with a solvent system comprising 2 parts toluene to 1 part ethyl acetate.

What is claimed is:

1. The composition of matter designated as factor I of antibiotic A–21101, said factor I being characterized by the following structural formula:

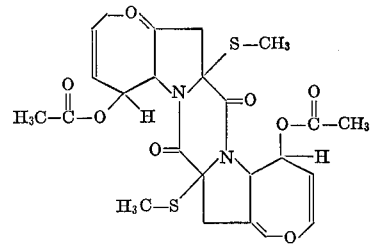

No references cited.

JOSEPH A. NARCAVAGE, Primary Examiner

J. TOVAR, Assistant Examiner

U.S. Cl. X.R.

260—243 R; 195—81